United States Patent
Shikata et al.

(10) Patent No.: US 6,758,740 B2
(45) Date of Patent: Jul. 6, 2004

(54) VEHICLE AIR CONDITIONER

(75) Inventors: Kazushi Shikata, Kariya (JP);
Tomohiro Kamiya, Takahama (JP);
Mak to Um bayashi, Chiryu (JP);
Tomohiro Inada, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/718,472

(22) Filed: Nov. 20, 2003

(65) Prior Publication Data

US 2004/0102151 A1 May 27, 2004

(30) Foreign Application Priority Data

Nov. 20, 2002  (JP) ..................................... 2002-336553
Nov. 22, 2002  (JP) ..................................... 2002-339242

(51) Int. Cl.[7] ............................................... B60H 7/00
(52) U.S. Cl. ..................... 454/75; 454/143; 237/12.3 B
(58) Field of Search ................................ 454/143, 152, 454/75; 237/12.3 B, 12.3 R

(56) References Cited

U.S. PATENT DOCUMENTS

| | | | |
|---|---|---|---|
| 4,819,715 A | * | 4/1989 | Kobayashi .................. 165/203 |
| 4,852,798 A | * | 8/1989 | Ito et al. ...................... 237/2 A |
| 4,858,677 A | * | 8/1989 | Doi et al. .................... 165/202 |
| 4,938,033 A | | 7/1990 | Ogihara et al. |

\* cited by examiner

Primary Examiner—Derek S. Boles
(74) Attorney, Agent, or Firm—Harness, Dickey & Pierce, PLC

(57) ABSTRACT

In an initial stage of a cool down operation of a vehicle air conditioner, a rapid cooling operation is performed while cool air is directly blown to a passenger from direct air outlets. In a later stage of the cool down operation of the vehicle air conditioner, a temperature of an inner wall portion of a passenger compartment is reduced while cool air is indirectly supplied to the passenger of the passenger compartment from the indirect air outlet. Accordingly, cool air can be locally blown to the passenger in the initial stage, and cool air can be supplied to the entire passenger compartment while restricting an adverse effect due to heat radiation of the inner wall portion in the later stage. Thus, operation performance of the air conditioner can be improved while comfortable air conditioning feeling can be given to the passenger in the passenger compartment.

20 Claims, 12 Drawing Sheets

VEHICLE AIR CONDITIONER

CROSS-REFERENCE TO RELATED APPLICATION

This application is related to and claims priority from Japanese Patent Applications No. 2002-336553 filed on Nov. 20, 2002 and No. 2002-339242 filed on Nov. 22, 2002, the contents of which are hereby incorporated by reference.

BACKGROUND OF THE INVENTION

1. Field of the Invention

The present invention relates to a vehicle air conditioner that has a direct air outlet for blowing conditioned air directly toward a passenger in a passenger compartment and an indirect air outlet for blowing conditioned air indirectly toward the passenger in the passenger compartment.

2. Description of Related Art

In a vehicle air conditioner described in JP-A-1-285417 (corresponding to U.S. Pat. No. 4,938,033), a cooling operation for cooling a passenger compartment is performed to have three operation stages, that is, a rapid cooling stage (cool down stage), a stationary cooling stage, and a transient cooling stage between the rapid cooling stage and the stationary cooling stage. Further, an air outlet mode is changed in accordance with the cooling operation stage. In the vehicle air conditioner, conditioned air is blown into the passenger compartment from an instrument panel, a center console and the like. Therefore, it is difficult to provide a uniform air temperature distribution or a uniform wind speed distribution in the passenger compartment. As a result, it is difficult to obtain a comfortable air-conditioning state in an entire passenger compartment.

SUMMARY OF THE INVENTION

In view of the above problems, it is a first object of the present invention to provide a vehicle air conditioner capable of providing a comfortable air-conditioning state in an entire passenger compartment by forming a uniform air temperature distribution or a uniform wind speed distribution.

It is a second object of the present invention to provide a vehicle air conditioner capable of providing a uniform air temperature distribution or a uniform wind speed distribution in an entire passenger compartment by effectively using a direct air outlet from which conditioned air is directly blown to a passenger of the passenger compartment and an indirect air outlet from which conditioned air is indirectly blown to the passenger of the passenger compartment.

According to the present invention, a vehicle air conditioner includes an air outlet portion having a plurality of air outlets from which conditioned air from an air conditioning unit is blown into a passenger compartment. The air outlet portion has a direct air outlet from which conditioned air is directly blown to a passenger in the passenger compartment, and an indirect air outlet from which conditioned air is indirectly supplied to the passenger to be diffused. Generally, the indirect air outlet is provided in an inner wall portion of the passenger compartment for supplying conditioned air substantially from an entire area of the inner wall portion. The vehicle air conditioner further includes a cooling state determining means for determining a proceeding state in a rapid cooling operation, and an air amount control unit for controlling an air amount blown from the direct air outlet and an air amount blown from the indirect air outlet based on the proceeding state detected by the cooling state determining means. In addition, the air amount control unit increases the air amount blown from the direct air outlet to be larger than the air amount blown from the indirect air outlet, when the cooling state determining means determines that the proceeding state is in an initial stage with respect to a predetermined stage. Thus, an air blowing direction and an air blowing amount from the air outlets into the passenger compartment can be controlled in accordance with an air-conditioning state in the passenger compartment. Therefore, rapid cooling of the passenger compartment can be obtained while comfortable feeling is given to the passenger. Accordingly, a comfortable air-conditioning environment can be provided in the entire passenger compartment, in the rapid cooling operation.

In addition, the air amount control unit increases the air amount blown from the indirect air outlet to be larger than the air amount blown from the direct air outlet, when the cooling state determining means determines that the proceeding state is in a later stage with respect to the predetermined stage. Further, when the cooling state determining means determines that the rapid cooling operation is ended, the air amount control unit reduces a total air amount blown into the passenger compartment to be smaller than that in the initial stage of the rapid cooling operation while supplying conditioned air from the indirect air outlet into the passenger compartment. Therefore, air conditioning feeling given to the passenger can be improved without a manual change of an air blowing control plate such as grills, an air outlet mode or an air blowing amount.

For example, the indirect air outlet is a wall-surface air blowing means for indirectly blowing conditioned air toward a passenger in the passenger compartment from an inner design wall portion of the passenger compartment, and the direct air outlet includes a seat air blowing means for directly blowing conditioned air toward a passenger on a seat in the passenger compartment. The cooling state determining means includes a rapid-cooling determining means for determining whether the rapid cooling operation is performed. Further, the air amount control unit includes a rapid-cooling amount control means for determining a first air amount to be blown from both of the wall-surface air blowing means and the seat air blowing means when the rapid-cooling determining means determines that the rapid cooling operation is performed, and a stationary-cooling amount control means for determining a second air amount to be blown from both of the wall-surface air blowing means and the seat air blowing means when the rapid-cooling determining means determines that the rapid cooling operation is not performed. Therefore, a uniform air temperature distribution or a uniform wind speed distribution in an entire passenger compartment can be provided by effectively controlling the air amount blown from the direct air outlet and the air amount blown from the indirect air outlet.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

First Embodiment

Figure 1:
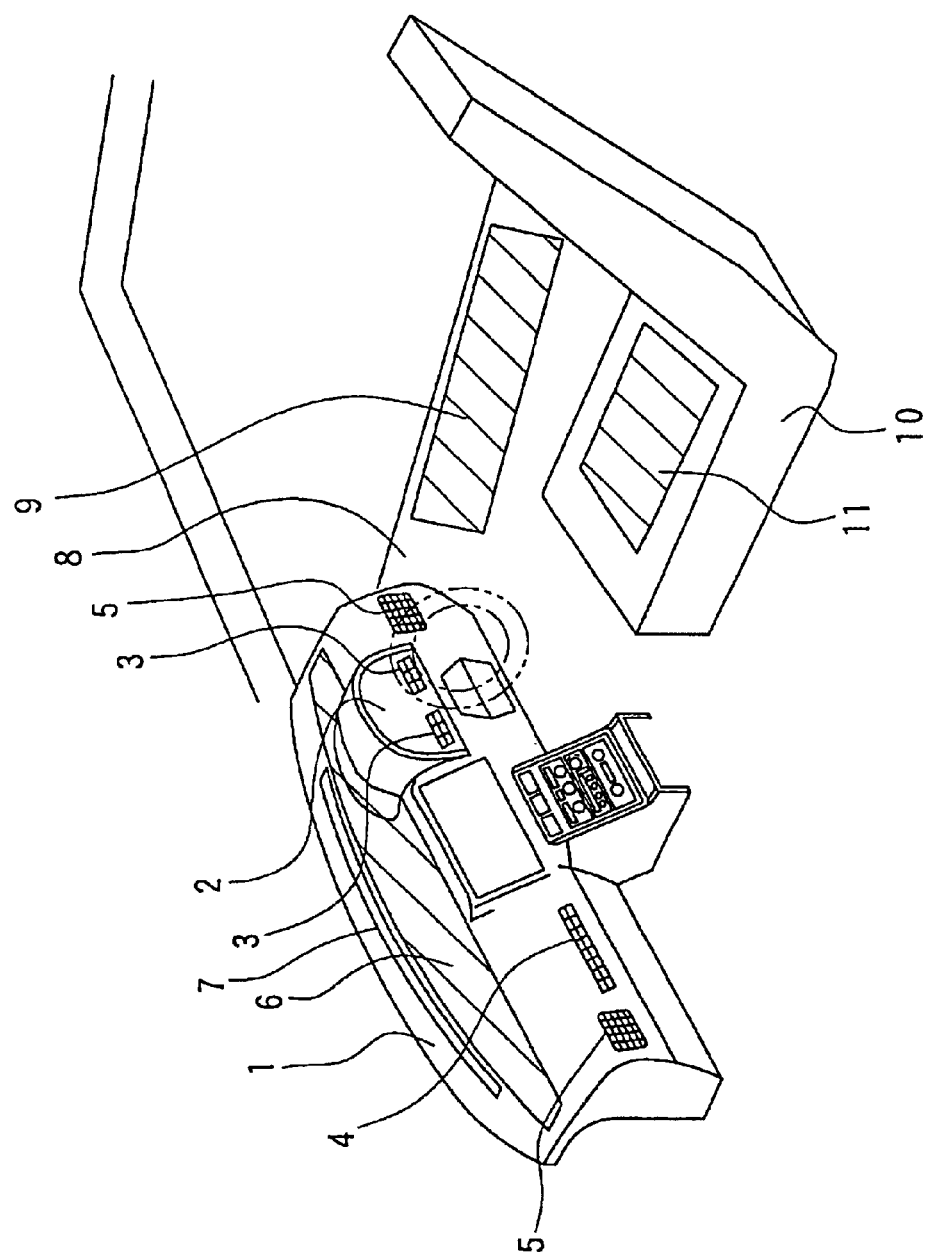
FIG. 1 is a perspective view showing a passenger compartment of a vehicle in which a vehicle air conditioner according to a first embodiment of the present invention is mounted.

A vehicle air conditioner according to the first embodiment will be described with reference to FIGS. 1–5. As shown in FIG. 1, an instrument panel portion 2 having a meter member such as a speed meter is provided in a dashboard 1 extending in a vehicle width direction (vehicle right-left direction), at a driver's seat side. An air conditioning unit (not shown), for controlling a temperature and a humidity of air to be blown into a passenger compartment, is provided in the dashboard 1 at a front passenger's seat side next to the driver's seat in the vehicle width direction.

The air conditioning unit is a general air conditioning unit including a cooling heat exchanger such as an evaporator for cooling air, a heating heat exchanger such as a heater core for heating air after passing through the cooling heat exchanger, a temperature adjustment unit for adjusting an air heating amount in the heating heat exchanger so that conditioned air having a predetermined temperature is obtained, and an air outlet mode door for electively opening and closing air outlet ports of an air outlet portion to set an air outlet mode.

A meter air outlet 3, from which conditioned air from the air conditioning unit is blown directly to the upper half body of a driver on a driver seat, is provided in a portion of the dashboard 1, where an instrument panel portion 2 is provided. A passenger's seat side face air outlet 4, from which conditioned air of the air conditioning unit is blown directly to the upper half body of a passenger on the front passenger's seat, is provided in the dashboard 1 above a glove box arranged at a passenger's seat side. Side face air outlets 5, from which conditioned air is blown to the side-end upper side in the passenger compartment, is provided in the dashboard 1 at two end sides in the vehicle width direction. An instrument panel air outlet (diffusion air outlet) 6, from which conditioned air is smoothly diffused to be oozed outside, is provided in the dashboard 1 on a substantially entire area of an upper surface (slant line portion in FIG. 1) of the dashboard 1.

A defroster air outlet 7, from which conditioned air of the air conditioning unit is blown to a front windshield, is provided in the dashboard 1 around the front windshield. A foot air outlet (not shown), from which conditioned air of the air conditioning unit is blown to a foot portion of the passenger on the front seat, is provided in the dashboard 1 at a lower side. A door air outlet 9, from which conditioned air is diffused to be oozed outside, is provided in a wall portion of a door 8. A seat air outlet 11, from which conditioned air is directly blown to the passenger on a seat 10, is provided in the seat 10 at its backrest portion and its seat portion. Conditioned air from the air conditioning unit is supplied to each of the air outlets 3–7, 9, 11 through an air duct (not shown).

Figure 5:
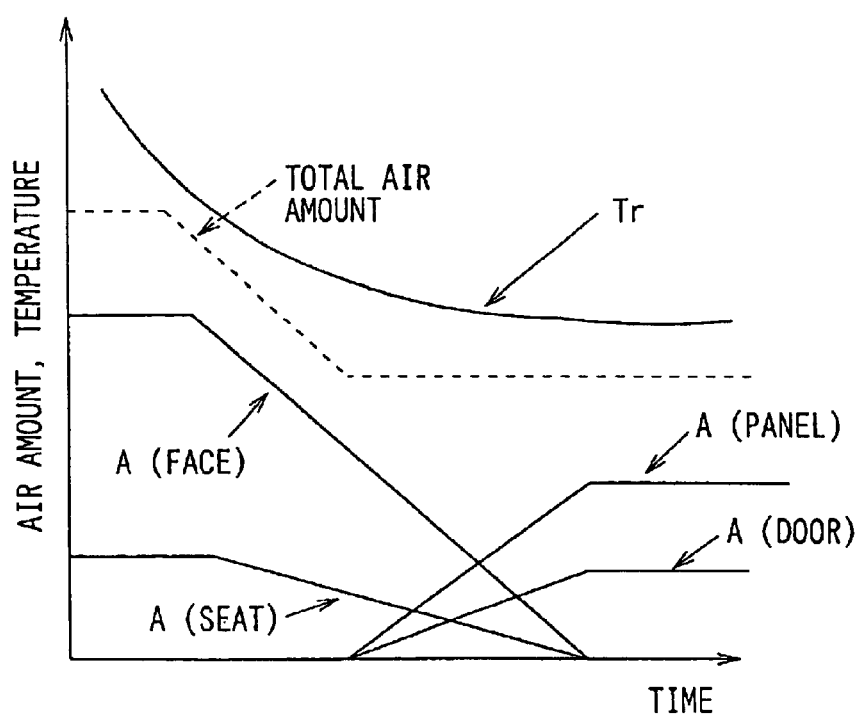
FIG. 5 is a graph showing a relationship between a passing time and each of air blowing amounts and an inside air temperature, in the vehicle air conditioner according to the first embodiment.

Next, operation of the vehicle air conditioner according to the first embodiment will be described. Cool down operation, that is, rapid cooling operation is separated into plural stages, for example, into the initial stage and the later stage. FIG. 5 shows an air amount change and a temperature change after the cooling operation is performed. In FIG. 5, Tr indicates an inside air temperature in the passenger compartment, A(FACE) indicates an air amount blown from the face air outlets such as the meter air outlet 3 and the passenger's seat side face air outlet 4, A(SEAT) indicates the air amount blown from the seat air outlet 11, A(PANEL) indicates the air amount indirectly blown from the instrument panel air outlet 6, and A(DOOR) indicates the air amount indirectly blown from the wall portion of the door air outlet 9.

Figure 2:
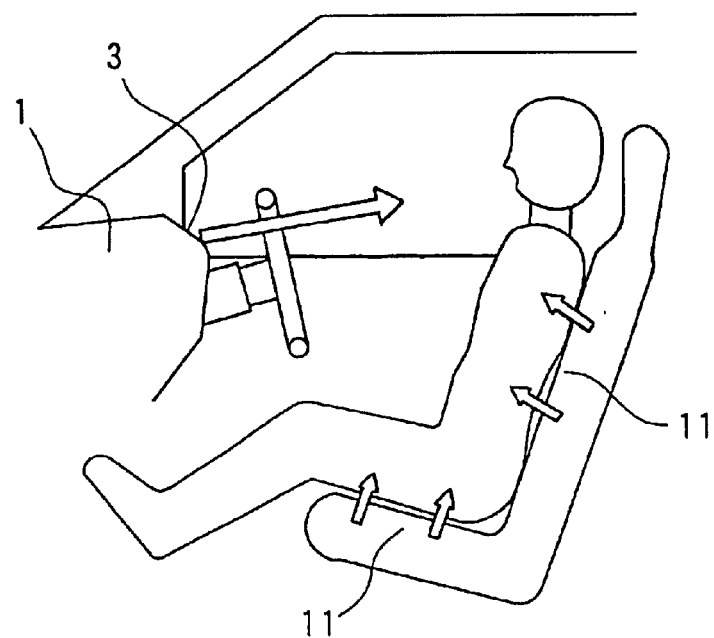
FIG. 2 is a schematic diagram showing a conditioned-air blowing state in an initial stage of a cool down operation, in the vehicle air conditioner according to the first embodiment.

As shown in FIG. 5, in the initial stage, a total air amount blown by the blower unit is set at a maximum value. At this time, conditioned air is directly blown to the passenger from the seat air outlet 11 and the face air outlet such as the meter air outlet 3 and the passenger's seat side face air outlet 4 as shown in FIGS. 2, 5. Then, in FIG. 5, as the cool down operation proceeds, that is, as the inside air temperature Tr of the passenger compartment reduces, the total air amount blown from the plural air outlets into the passenger compartment is reduced.

Figure 3:
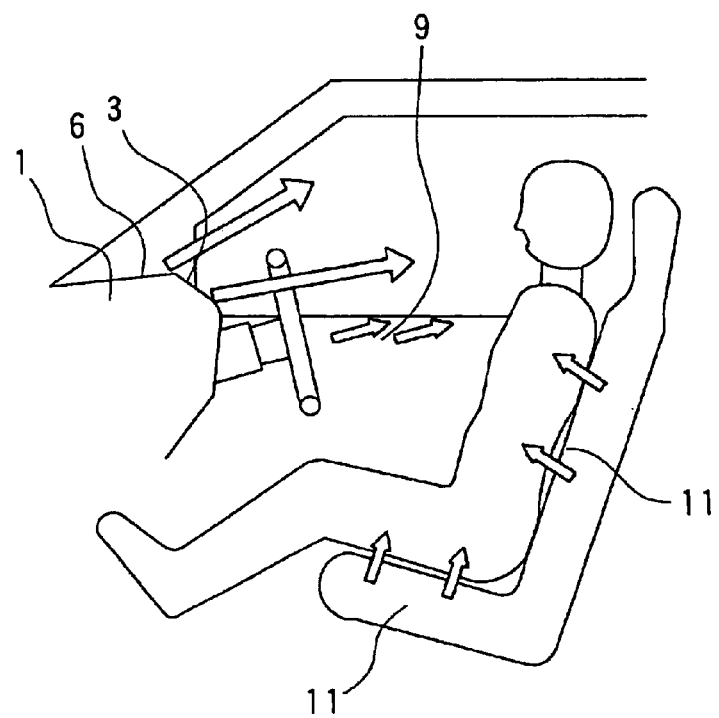
FIG. 3 is a schematic diagram showing a conditioned-air blowing state in a later stage of the cool down operation in the vehicle air conditioner according to the first embodiment.
Figure 4:
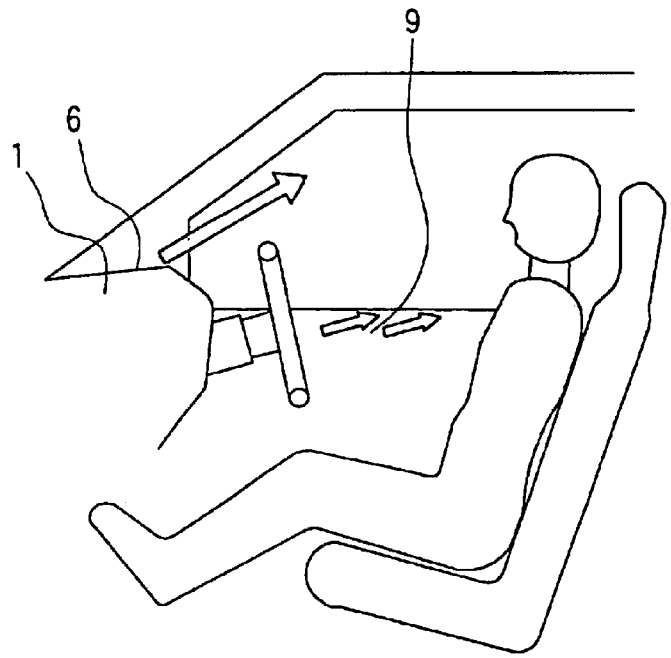
FIG. 4 is a schematic diagram showing a conditioned-air blowing state after the cool down operation is ended, in the vehicle air conditioner according to the first embodiment.

When the cool down operation further proceeds and the inside air temperature Tr reduces to a predetermined temperature, the initial stage of the cool down operation is changed to the later stage of the cool down operation, and reduction of the total air amount blown into the passenger compartment is stopped as shown in FIG. 5. In the later stage of the cool down operation, as shown in FIGS. 3, 5, air blowing amounts A(PANEL), A(DOOR) from indirect air outlets such as the instrument panel air outlet 6 and the door air outlet 9 are increased while air blowing amounts A(FACE), A(SEAT) from direct air outlets such as the face air outlet 3, 4 and the seat air outlet 11 are reduced. Thereafter, when the cool down operation is stopped, conditioned air is blown only from the indirect air outlets such as the instrument panel air outlet 6 and the door air outlet 9 as shown in FIG. 4, and the total air amount to be blown into the passenger compartment is reduced than that in the initial stage of the cool down operation.

In the first embodiment, a temperature difference $\Delta T$ between the inside air temperature Tr and any one of a set temperature and a target air blowing temperature TAO is calculated. When the temperature difference $\Delta T$ is equal to or larger than a first predetermined temperature difference T1, it is determined that the cooling operation is in the initial stage of the cool down operation. When the temperature difference $\Delta T$ is smaller than the first predetermined temperature difference T1 and larger than a second predetermined temperature difference T2 smaller than the first predetermined temperature difference T1, it is determined that the cooling operation is in the later stage of the cool down operation. When the temperature difference $\Delta T$ becomes smaller than a third predetermined temperature difference T3 smaller than the second predetermined temperature difference T2, it is determined that the cooling operation is in the stationary operation state after the cool down operation is ended.

Here, the target air blowing temperature TAO is a control target air temperature determined based on the set temperature set by the passenger, an outside air temperature, the inside air temperature and a solar radiation amount entering into the passenger compartment. Normally, as the target air blowing temperature TAO reduces, an electronic control unit (ECU) determines that an air conditioner requires a larger cooling capacity.

Next, operational effects of the vehicle air conditioner according to the first embodiment will be described. In the initial stage of the cool down operation, cool air is blown toward the passenger from the direct air outlets such as the meter air outlet 3, the face air outlet 4 and the seat air outlet 11 by the maximum value. Therefore, in the initial stage of the cool down operation, rapid cooling of the passenger compartment can be performed while cooling feeling can be effectively given to the passenger. Further, in the first embodiment, the air amount, to be blown from the seat air outlet 11, is also automatically controlled. Therefore, comfortable rapid cooling feeling can be given to the passenger without a manual operation for changing an air blowing amount from the seat air outlet 11.

If air is continuously blown from the direct air outlet to the passenger in a transient stage of the cool down operation where the inside air temperature Tr gradually reduces, uncomfortable feeling is given to the passenger. Therefore, in this case, the passenger may manually adjust an air blowing direction. However, in the first embodiment, as the cool down operation proceeds, the opening states of the air outlet from which conditioned air is blown are changed. Therefore, preferable air-conditioning feeling can be given to the passenger, and cool air can be supplied into an entire passenger compartment without a manual operation annoying the passenger. As the inside air temperature Tr reduces, the opening states of the air outlets are changed from the direct air outlet to the indirect air outlet. Therefore, preferable air-conditioning feeling can be given to the passenger while the manual operation annoying the passenger in the transient stage of the cool down operation can be eliminated.

In the later stage of the cool down operation, since conditioned air can be blown indirectly from the upper surface of the dashboard 1 (instrument panel air outlet 6) and the door 8 (door air outlet 9), a temperature of an inner wall portion of the passenger compartment such as the upper surface of the dashboard 1 and the door 8 can be reduced. If the temperature of the inner wall portion of the passenger compartment increases, heat is radiated from the inner wall portion to the passenger, and non-uniform thermal feeling may be given to the passenger. However, in the first embodiment of the present invention, because it can prevent heat from being radiated from the inner wall portion to the passenger, this non-uniform thermal feeling can be prevented from being given to the passenger. As a result, comfortable air-conditioning feeling can be given to the passenger in the passenger compartment.

Second Embodiment

Figure 7:
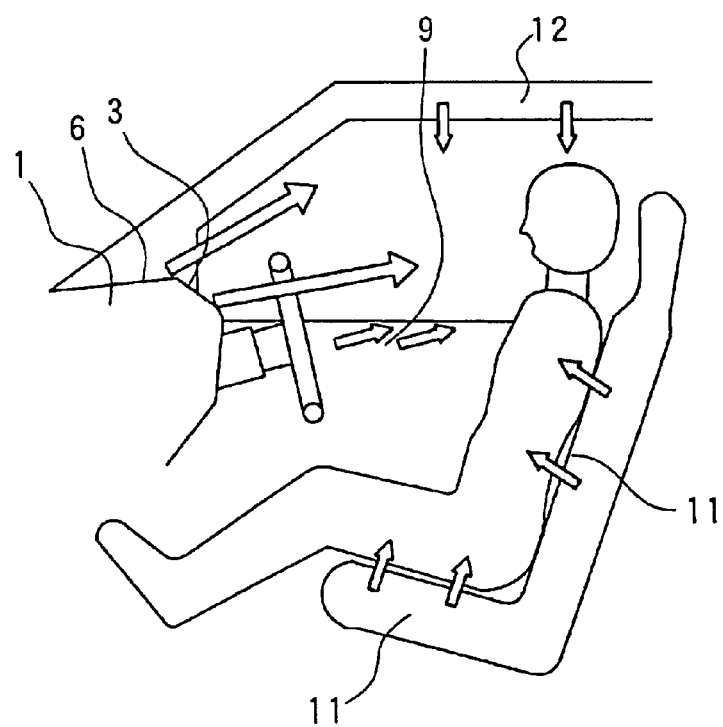
FIG. 7 is a schematic diagram showing a conditioned-airblowing state in a later stage of the cool down operation, in the vehicle air conditioner according to the second embodiment.
Figure 8:
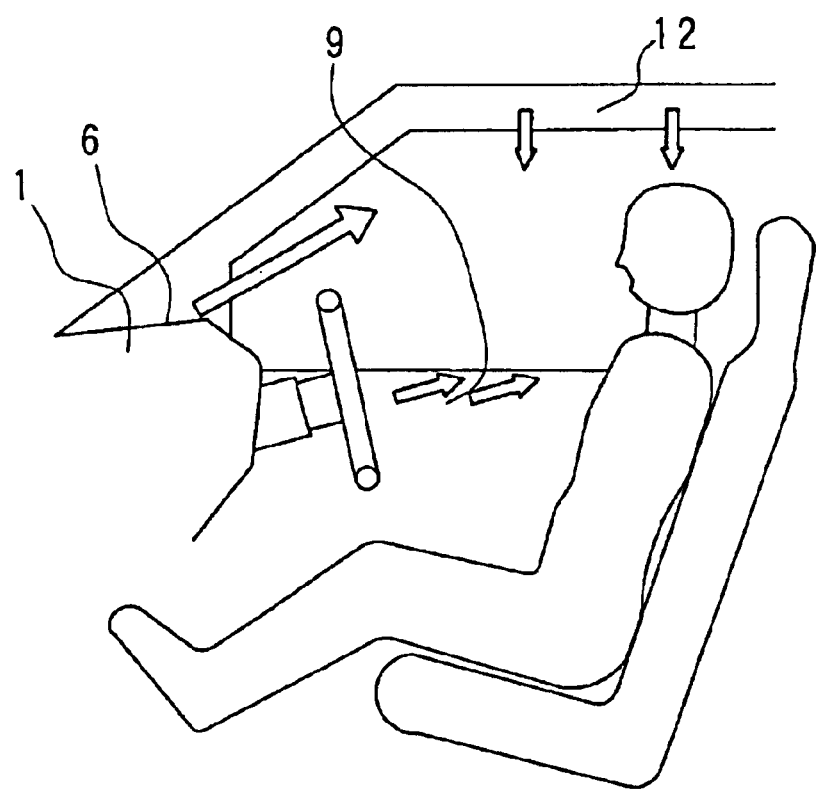
FIG. 8 is a schematic diagram showing a conditioned-airblowing state after the cool down operation is ended, in the vehicle air conditioner according to the second embodiment.

The second embodiment of the present invention will be described with reference to FIGS. 6–8. In the above-described first embodiment of the present invention, the instrument panel air outlet 6 and the door air outlet 9 are used as the indirect air outlet. However, in the second embodiment, a ceiling air outlet 12 shown in FIG. 7 is also provided as the indirect air outlet. In the second embodiment, the other parts air similar to those of the above-described first embodiment.

Figure 6:
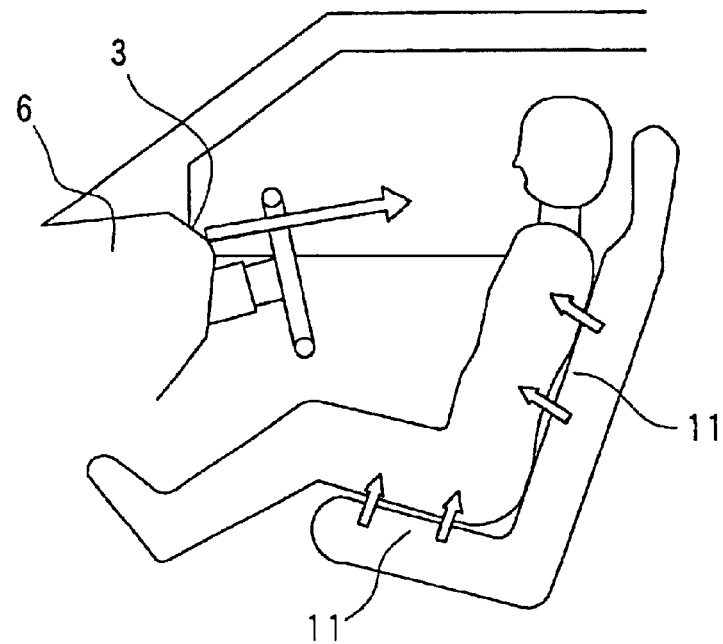
FIG. 6 is a schematic diagram showing a conditioned-air blowing state in an initial stage of a cool down operation, in a vehicle air conditioner according to a second embodiment of the present invention.

A conditioned-air blowing state in the initial stage of the cool down operation is shown in FIG. 6. In the initial stage of the cool down operation, as shown in FIG. 6, conditioned air (cool air) is directly blown from the seat air outlet 11 and the face air outlets such as the meter air outlet 3 and the passenger's seat side face air outlet 4, similarly to that in the above-described first embodiment. The later stage of the cool down operation is shown in FIG. 7. In the later stage of the cool down operation, the air blowing amount from the direct air outlets 3, 4 is reduced, and the air blowing amount from the indirect air outlets 6, 9, 12 is increased. A conditioned-air blowing state in the stationary operation after the cool down operation is ended is shown in FIG. 8. In the stationary operation, conditioned air is blown from the indirect air outlets including the instrument panel air outlet 6, the door air outlet 9, and the ceiling air outlet 12.

According to the second embodiment of the present invention, because the ceiling air outlet 12 is also added in the indirect air outlet, air conditioning feeling given to the passenger in the passenger compartment can be further improved.

Third Embodiment

Figure 9:
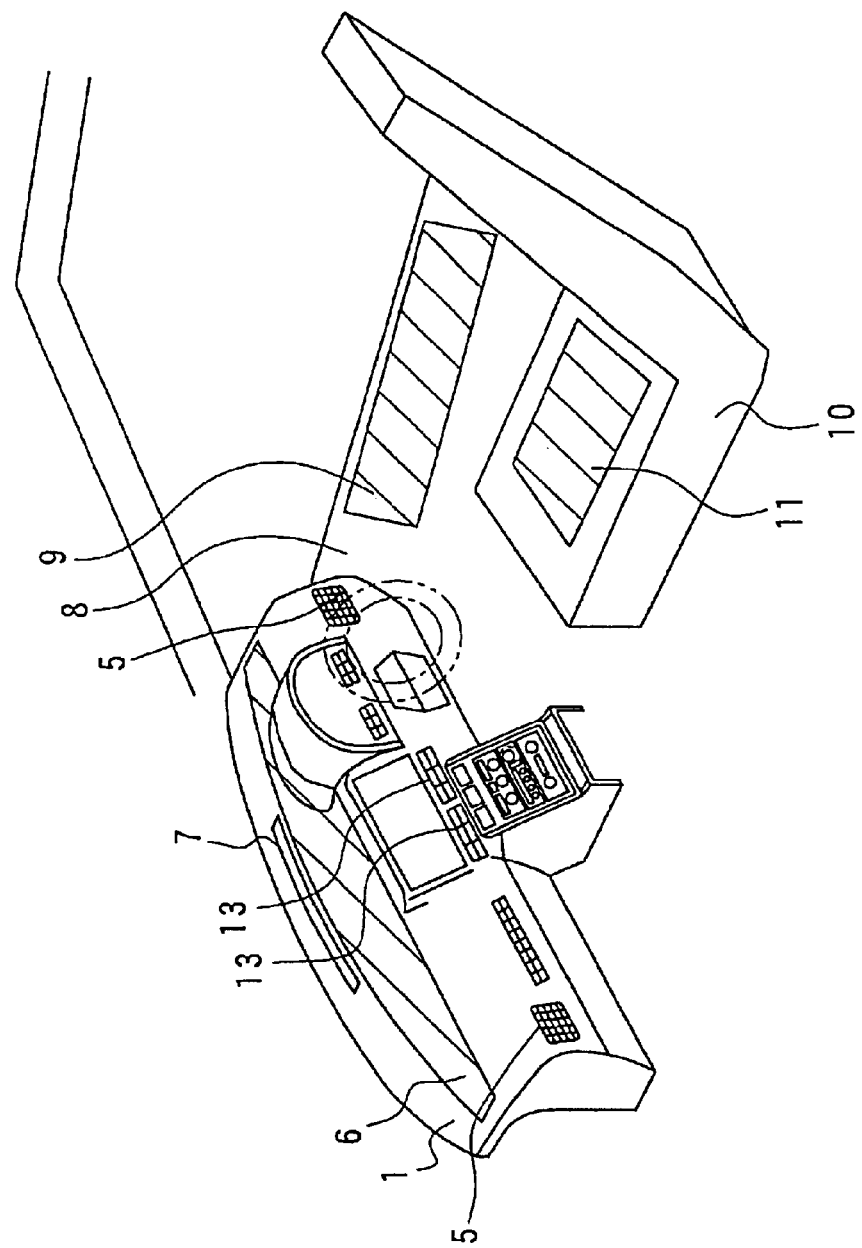
FIG. 9 is a perspective view showing a passenger compartment of a vehicle in which a vehicle air conditioner according to a third embodiment of the present invention is mounted.

In the above-described first embodiment, the face air outlet used as the direct air outlet includes the meter air outlet 3 and the passenger's seat side face air outlet 4. In the third embodiment, the meter face air outlet 3 and the passenger face air outlet 4 are eliminated. Instead of the direct air outlets 3, 4, as shown in FIG. 9, a center face air outlet 13 is provided substantially in a center area of the dashboard 1 in the vehicle width direction, to be used as the direct air outlet. In the third embodiment, the other parts are similar to those of the above-described first embodiment, and advantages described above can be obtained.

Fourth Embodiment

The fourth embodiment will be described with reference to FIGS. 10–15. As shown in FIG. 14, a vehicle air conditioner according to the fourth embodiment includes a front air conditioning unit 110, a rear air conditioning unit 120 and an exterior air conditioning unit 130. The front air conditioning unit 110 is disposed at a front side in the passenger compartment, and the rear air conditioning unit 120 is disposed in a trunk located at a vehicle rear side. The exterior air conditioning unit 130 is disposed in an engine compartment.

The front air conditioning unit 110 includes an air conditioning case 111, an inside-outside air introduction unit 112, an air filter 113 and a blower fan 114. The air conditioning case 111 is provided for forming a front air passage through which air flows toward a front seat area in the passenger compartment. The inside-outside air introduction unit 112 adjusts a flow ratio between inside air and outside air to be introduced into the air conditioning case 111. The air filter 113 removes dust from air to be introduced into the air conditioning case 111.

A defroster air supply port 115a, a face air supply port 115b, a foot air supply port 115c, a seat air supply port 115d and a ceiling air supply port 115e are provided on the air conditioning case 111 at the most downstream side. Conditioned air is supplied from the defroster air supply port 115a to a defroster air outlet, to be blown to an inner surface of a front windshield from the defroster air outlet. Conditioned air is supplied from the face air supply port 115b to a face air outlet, to be blown to an upper side at the front seat side in the passenger compartment from the face air outlet. Conditioned air is supplied from the foot air supply port 115c to a foot air outlet, to be blown to a lower side in the front seat area of the passenger compartment from the foot air outlet. Conditioned air is supplied from the seat air supply port 115d to the front seat 141, to be blown from a front seat 141 shown in FIG. 10 to the passenger. Conditioned air is supplied from the ceiling air supply port 115e to a ceiling (i.e., roof), to be blown from the ceiling into the passenger compartment at the front seat side.

Air outlet mode doors 116a–116e, for adjusting air blowing amounts to be supplied to the air supply ports 115a–115e and for switching the air outlet mode, are provided upstream of the air supply ports 115a–115e, respectively. In FIG. 14, the air outlet mode doors 116a–116e are independently provided for the air supply ports 115a–115e, respectively. However, the present invention is not limited to this manner.

Further, a front cooling unit 117, a front heating unit 118, an air mixing door 119 and the like are disposed in the air conditioning case 111 downstream of the blower fan 114 and upstream of the air outlet mode doors 116a–116e. The front cooling unit 117 cools air flowing in the air conditioning case 111, and the front heating unit 118 disposed downstream of the front cooling unit 117 heats air after passing through the front cooling unit 117. The air mixing door 119 adjusts a temperature of air to be blown into the passenger compartment by adjusting a flow ratio between hot air passing through the front heating unit 118 and cool air bypassing the front heating unit 118.

The front cooling unit 117 is a cooling heat exchanger obtaining heat-absorbing performance by evaporating refrigerant flowing therethrough. The front heating unit 118 is a heating heat exchanger for heating air by using waste heat generated in the vehicle such as engine cooling water, as a heat source. Further, conditioned air, blown from the seat air supply port 115d, is supplied to the front seat 41 through an air duct provided under a vehicle floor of the passenger compartment. Conditioned air, blown from the ceiling air supply port 115e, is introduced to a large number of air outlets provided in the ceiling (i.e., roof) through an air duct provided in A pillars located right and left end sides of the windshield.

The rear air conditioning unit 120 is not provided with the inside-outside air introduction unit, the defroster air supply port, the face air supply port and the foot air supply port. Except for this point, substantially, the rear air conditioning unit 120 has the same structure as the front air conditioning unit 110. Specifically, the rear air conditioning unit 120 includes an air conditioning case 121 for defining an air passage through which air flows toward a rear seat side in the passenger compartment. Further, the rear air conditioning unit 120 includes an air filter 123 for filtering air, a blower fan 124 for blowing air in the air conditioning case 121, a rear cooling unit 127 for cooling air, a rear heating unit 128 for heating air, and a rear air mixing door 129 for adjusting a flow ratio between air passing through the rear heating unit 128 and air bypassing the rear heating unit 128, which are provided in the air conditioning case 121. In addition, the air conditioning case 121 is provided with a seat air supply port 125d, a ceiling air supply port 125e and air outlet mode doors 126d, 126e, at the most downstream end side. Conditioned air is supplied from the seat air supply port 125d to a rear seat 142, to be blown from the rear seat 142 shown in FIG. 10 to the passenger on the rear seat 142. Conditioned air is supplied from the ceiling air supply port 125e to the ceiling, to be blown from the ceiling to the rear seat side in the passenger compartment. The air outlet mode doors 126d, 126e adjust air amounts to be supplied to the air supply ports 125d, 125e, respectively, and switch a rear air outlet mode.

The rear cooling unit 127 is a low pressure side heat exchanger of a vapor-compression refrigerant cycle, similarly to the front cooling unit 117. The rear heating unit 128 is a heating heat exchanger for heating air by using waste heat as a heat source, similarly to the front heating unit 118.

Further, conditioned air from the seat air supply port 125d is supplied from a back side of the rear seat 142 to the rear seat 142. Conditioned air from the ceiling air supply port 125e is supplied to plural air outlets provided in the ceiling through an air duct provided in C pillars located right and left ends of a rear window glass.

The exterior unit 130 includes a compressor 131, a condenser 132 and a receiver 133. The compressor 131 is driven by a driving force from a vehicle engine for running the vehicle, and sucks and compresses refrigerant. An operation rate (displacement) of the compressor 131 is controlled by interrupting a solenoid clutch for transmitting the driving force from the vehicle engine to the compressor 131. Alternatively, a variable displacement compressor is used as the compressor 131, and its displacement is controlled.

The condenser 132 is a high-pressure heat exchanger for cooling refrigerant discharged from the compressor 131 by performing heat-exchanging between the refrigerant and outside air. In the fourth embodiment, freon is used as the refrigerant. In this case, a refrigerant pressure discharged from the compressor 131, that is, a refrigerant pressure at a high pressure side is set equal to or lower than the critical pressure of refrigerant. Therefore, the enthalpy of refrigerant is reduced while refrigerant is condensed in the condenser 132.

The receiver 133 is a gas-liquid separator for separating refrigerant circulated in a vapor compression refrigerant cycle into gas refrigerant and liquid refrigerant, and for storing excess refrigerant as the separated liquid refrigerant. In the fourth embodiment, the receiver 133 is disposed in a refrigerant passage provided at a refrigerant outlet side of the condenser 132, so as to supply the separated liquid refrigerant to both of the front and rear cooling units 117, 127.

Decompression devices 134a, 134b decompress refrigerant flowing into the front cooling unit 117 and refrigerant flowing the rear cooling unit 127, respectively. In the fourth embodiment, a thermal expansion valve is used as each of the decompression devices 134a, 134b. A throttle open degree of the thermal expansion valve is controlled so that a super-heating degree of refrigerant, to be sucked into the compressor 131, is set at a predetermined degree. By interrupting solenoid valves 135a, 135b, refrigerant supply states to the cooling units 117, 127 are controlled, respectively. That is, by interrupting the solenoid valves 135a, 135b, the cooling capacities of the cooling units 117, 127 are controlled, respectively.

Figure 15:
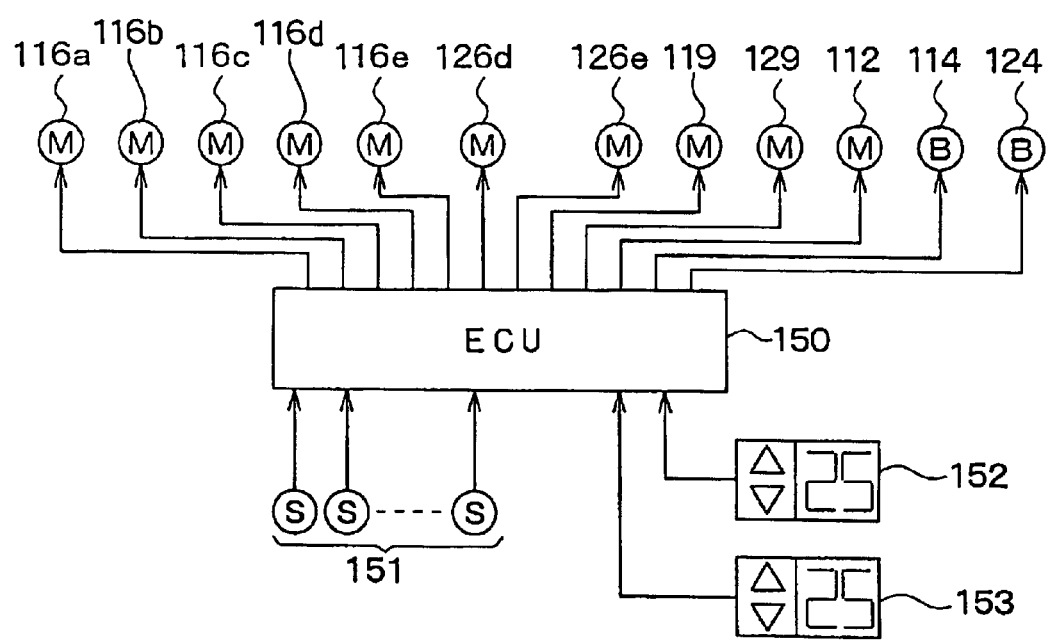
FIG. 15 is a schematic diagram showing a control system of the vehicle air conditioner according to the fourth embodiment.

As shown in FIG. 15, the blowers 114, 124, the air mixing doors 119, 129, the air outlet mode doors 116a–116e, 126d, 126e and the likes are controlled by an electronic control unit (ECU) 150. The ECU 150 receives detection values of air conditioning sensors 151, a set air temperature input to a front control unit 152 and a set air temperature input to a rear control unit 153. The air conditioning sensors 151 detect parameters required for air conditioning control, such as an inside air temperature, an outside air temperature, a solar radiation amount radiated into the passenger compartment and a temperature of engine cooling water to be supplied to the heating units 118, 128. Further, the set air temperature input to the front control unit 152 is a temperature required on the front seat side in the passenger compartment, and the set temperature input to the rear control unit 153 is a temperature required on the rear seat side in the passenger compartment.

Here, the ceiling air supply ports 115e, 125e and indirect air outlets provided in the ceiling are a wall-surface air blowing means for indirectly blowing conditioned air toward the passenger in the present invention from an inner design wall portion of the passenger compartment. Further, the seat air supply ports 115d, 125d and direct air outlets provided in the seat are a seat air blowing means for directly blowing conditioned air toward the passenger on the seat, in the present invention.

Next, control operation of the vehicle air conditioner according to the fourth embodiment will be described. First, the control operation of the rear air conditioning unit 120 for blowing conditioned air toward a rear seat area in the passenger compartment will be now described.

Figure 10:
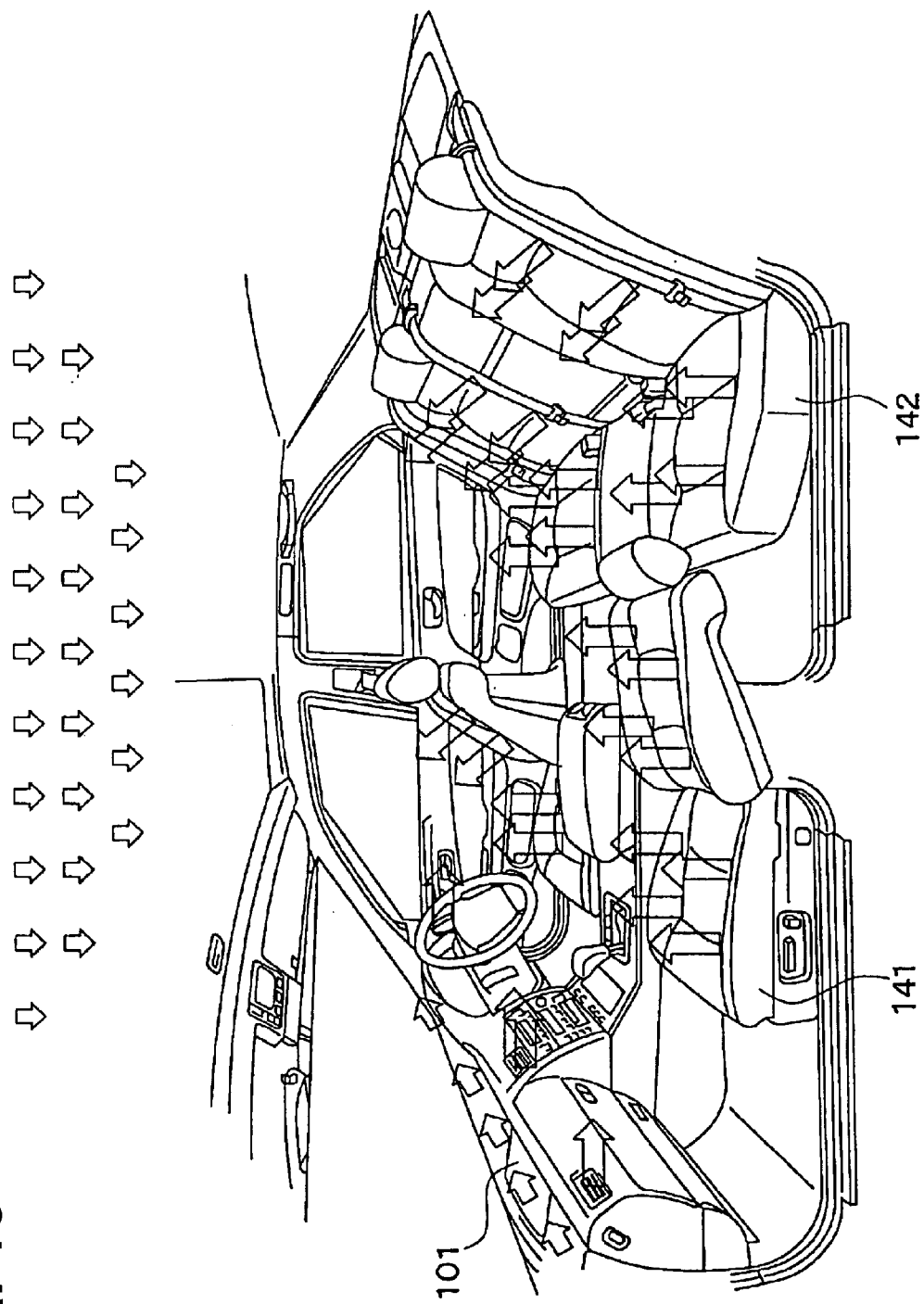
FIG. 10 is a perspective view showing a conditioned-airblowing state in an initial stage of a cool down operation of a vehicle air conditioner, in a passenger compartment of a vehicle, according to a fourth embodiment of the present invention.
Figure 11:
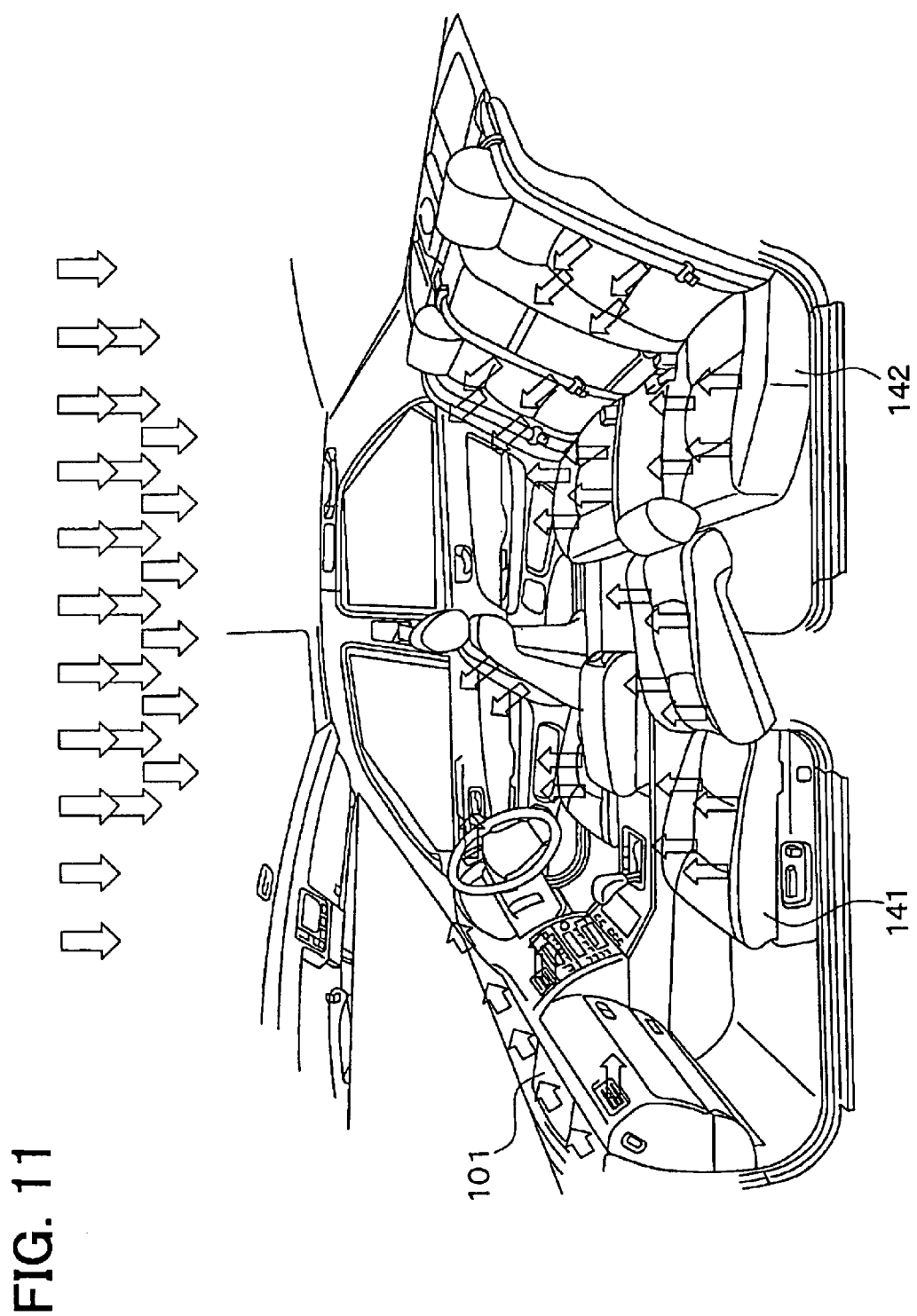
FIG. 11 is a perspective view showing a conditioned-airblowing state in a later stage of the cool down operation of the vehicle air conditioner, in the passenger compartment of the vehicle, according to the fourth embodiment.

The cool down operation is separated into plural stages (e.g., initial and later stages). In the initial stage of the cool down operation, as shown in FIG. 10, air blown by the rear blower fan 124 is set at a maximum amount, so that an air amount to be blown from the rear seat 142 is set larger than an air amount to be blown from the ceiling. That is, in the initial stage of the cool down operation (rapid cooling operation), the air amount blown from the direct air outlet of the seat air blowing means is increased to be larger than the air amount blown from the indirect air outlet of the wall-surface air blowing means (ceiling air blowing means). In the later stage of the cool down operation, as shown in FIG. 11, a flow ratio of the air amount to be blown from the ceiling to the air amount to be blown from the rear seat 142 is set larger than that in the initial stage, so that the air amount to be blown from the ceiling is set substantially equal to the air amount to be blown from the rear seat 142. That is, in the later stage of the rapid cooling operation, a flow ratio of the air amount blown from the indirect air outlet of the wall-surface air blowing means (ceiling air blowing means) to the air amount blown from the direct air outlet of the seat air blowing means is increased to be larger than that in the initial stage.

Figure 12:
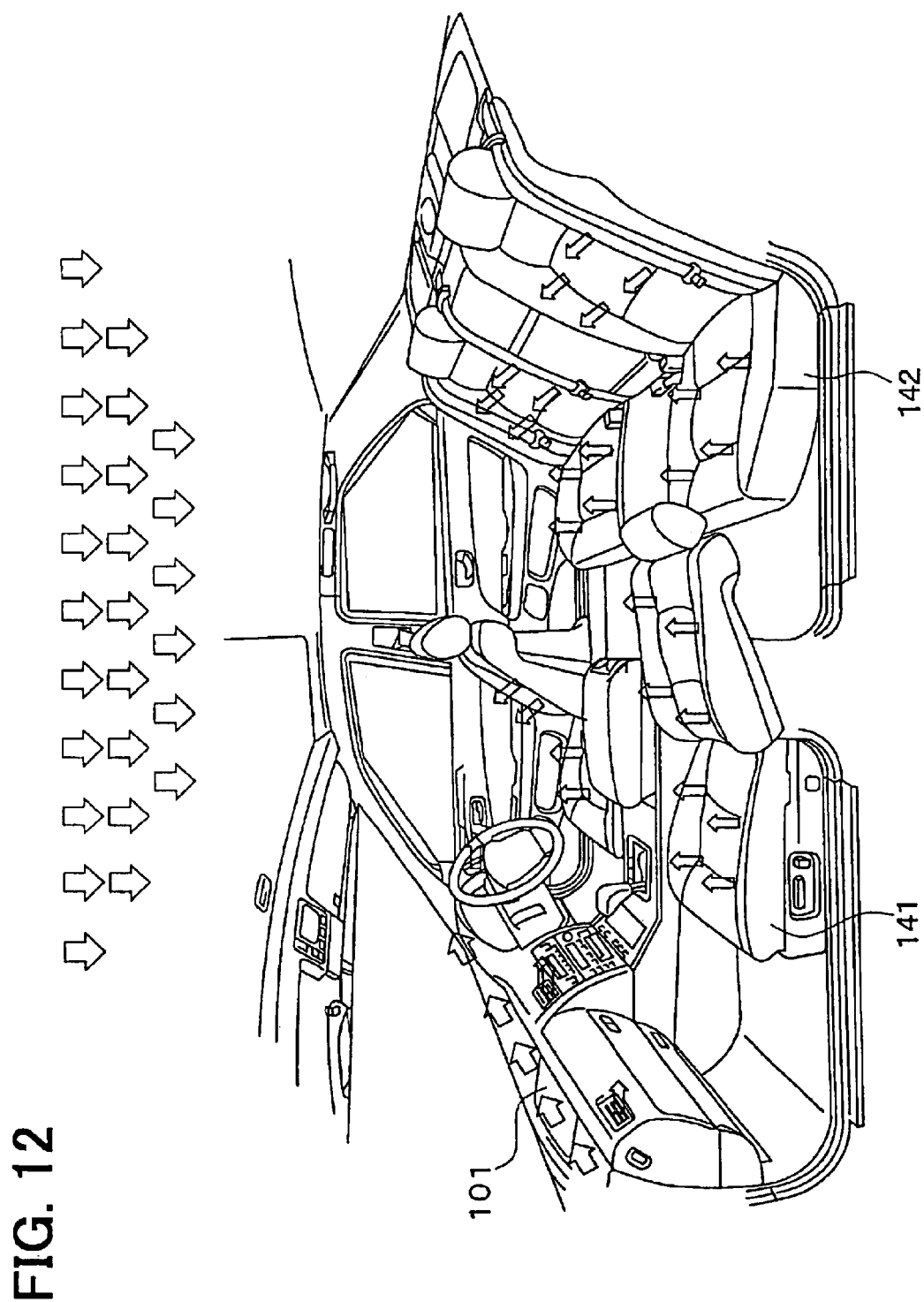
FIG. 12 is a perspective view showing a conditioned-airblowing state in a stationary cooling operation of the vehicle air conditioner, in the passenger compartment of the vehicle, according to the fourth embodiment.

Then, when the cool down operation is ended, the stationary cooling operation shown in FIG. 12 is performed. In the stationary cooling operation, as shown in FIG. 12, the air amount blown by the rear blower fan 124 is reduced than that in the cool down operation, so that the air amount to be blown from the ceiling is set larger than the air amount to be blown from the rear seat 142.

Figure 13:
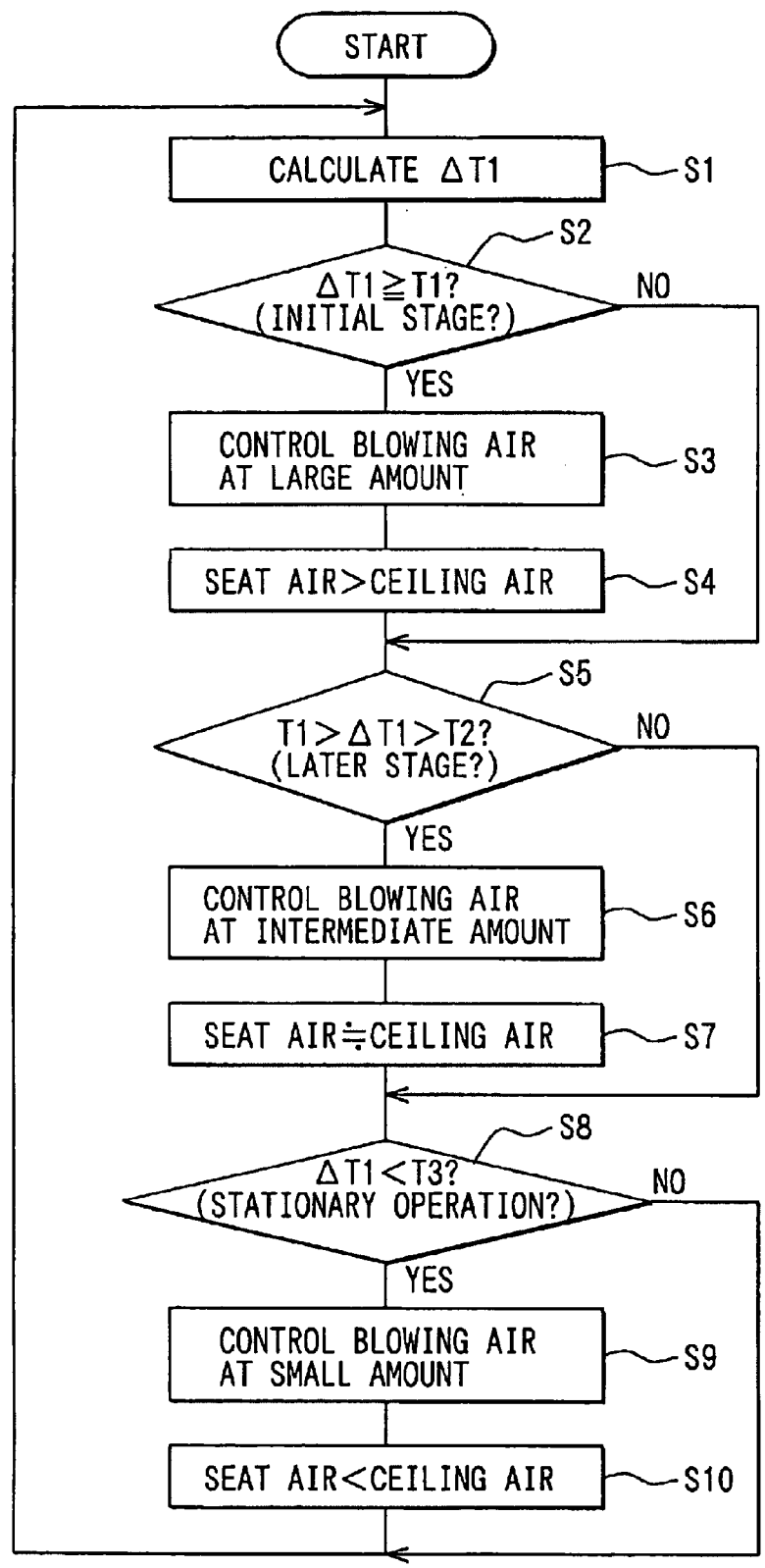
FIG. 13 is a flow diagram showing a control process of the vehicle air conditioner according to the fourth embodiment.
Figure 14:
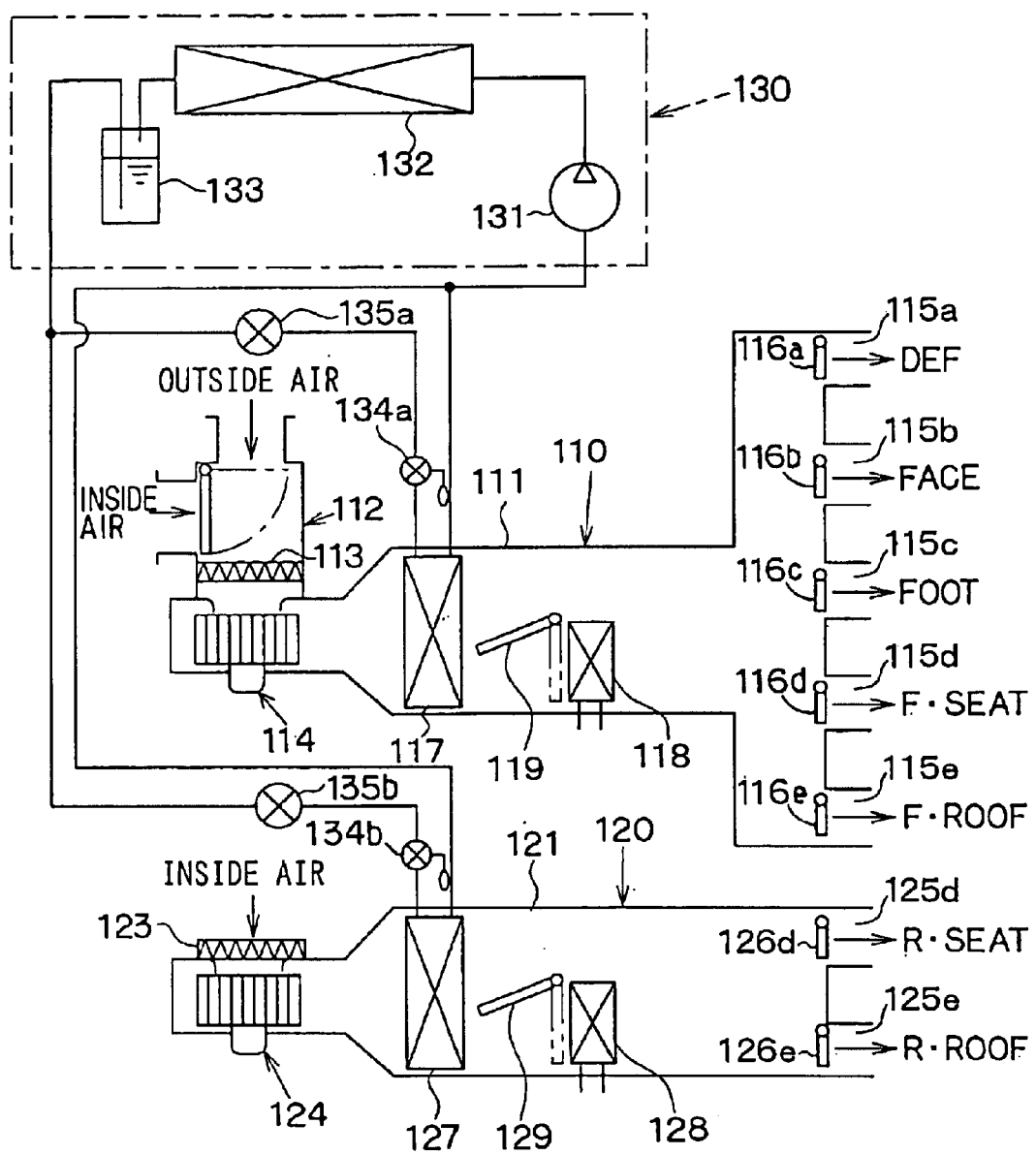
FIG. 14 is a schematic diagram showing the vehicle air conditioner according to the fourth embodiment.

Specifically, as shown in FIG. 13, a temperature difference ΔT1 between the inside air temperature Tr and a set temperature, or between the inside air temperature Tr and the target air blowing temperature TAO is calculated, at step S1. At step S2, it is determined whether the temperature difference ΔT1 is equal to or larger than a first predetermined temperature difference T1. When it is determined at step S2 that the temperature difference ΔT1 is equal to or larger than the first predetermined temperature difference T1, it is determined that the operation is in the initial stage of the cool down operation, and air blown by the blower fan 124 is set at the maximum amount (large amount) at step S3. At step S4, the air amount (seat air) to be blown from the direct air outlet of the rear seat 142 is set larger than the air amount (ceiling air) to be blown from the indirect air outlet of the ceiling. In the fourth embodiment, at step S4, the air amount blown from the direct air outlet of the rear seat 142 is set equal to or larger than 70% of the air amount blown by the blower fan 124, and the air amount to be blown from the direct air outlet of the ceiling is set equal to or smaller than 30% of the air amount blown by the blower fan 124.

The target air blowing temperature TAO is obtained from the set temperature, the detection values of the air conditioning sensors 151 and the likes. Normally, as the target air blowing temperature TAO reduces, the ECU 150 determines that cooling capacity required in the passenger compartment is larger. In this case, the ECU 150 reduces an air amount passing through the rear heating unit 128 by adjusting the open degree of the air mixing door 129 while increasing the air amount blown by the blower fan 124.

When it is determined at step S5 that the ceiling operation is in the later stage of the cool down operation, that is, when it is determined at step S5 that the temperature difference ΔT1 is smaller than the first predetermined temperature difference T1 and larger than a second predetermined temperature difference T2, air to be blown by the blower fan 124 is set at an intermediate amount at step S6. At step S7, the flow ratio of the air amount to be blown from the indirect air outlet of the ceiling to the air amount to be blown from the direct air outlet of the rear seat 142 is set larger than that in the initial stage of the cooling operation.

Specifically, in the fourth embodiment, the air amount to be blown from the rear seat 142 is set equal to or larger than 40% of the air amount blown by the blower fan 124, and the air amount to be blown from the ceiling is set equal to or smaller than 60% thereof. The air amount to be blown from the rear seat 142 can be set equal to or larger than 50% of the air amount blown by the blower fan 124, and the air amount to be blown from the ceiling can be set equal to or smaller than 50% thereof.

In the cooling operation, as the target air blowing temperature TAO increases, the air amount to be blown by the blower fan 124 is reduced. Therefore, at step S6, the air amount blown by the blower fan 124 is set at the intermediate amount. Further, at step S7, the air amount (seat air) blown from the direct air outlet of the rear sear 142 is set approximately equal or slightly larger than the air amount (ceiling air) blown from the indirect air outlet of the ceiling.

When it is determined at step S8 that the temperature difference ΔT1 is smaller than a third predetermined temperature difference T3 that is smaller than the second predetermined temperature difference T2, it is determined that the cool down operation is ended and the stationary cooling operation is started. At step S9, the air amount blown by the blower fan 124 is reduced than that in the cool down operation. At step S10, the flow ratio of the air amount to be blown from the ceiling to the air amount to be blown from the rear seat 142 is set larger than that in the later stage of the cool down operation, so that the air amount to be blown from the ceiling is set larger than the air amount to be blown from the rear seat 142. For example, in the stationary cooling operation, the air amount to be blown from the ceiling is set approximately at 70% of the air amount blown by the blower fan 124.

Accordingly, the rear air outlet mode is controlled in accordance with air conditioning state in the rear seat area of the passenger compartment. Therefore, rapid cooling of the passenger compartment can be performed while comfortable air-conditioning feeling can be given to the passenger. Thus, a comfortable air-conditioning environment can be provided in the entire passenger compartment.

The control operation of the front air conditioning unit 110 is similar to that of the rear air conditioning unit 120. Next, a control operation of the front air conditioning unit 110 will be now described. More specifically, an air amount to be blown from a diffusion air outlet (indirect air outlet) of a diffusion air blowing means, an air amount to be blown from a local air outlet (direct air outlet) of a local air blowing means and an air amount to be blown from the direct air outlet of the front seat 141 (seat air blowing means) to the passenger are controlled. The diffusion air outlet, from which conditioned air of the front air conditioning unit 10 is diffused, is provided in a dashboard 101 on a substantially entire area of an upper surface shown in FIG. 10. The local air outlet such as a face air outlet, from which conditioned air is locally blown toward the passenger, is provided on the dashboard 101.

In the initial stage of the cool down operation, the air amount to be blown from both the diffusion air outlet of the diffusion air blowing means and the face air outlet of the local air blowing means is set larger than the air amount to be blown from the front seat 141 (seat air blowing means), and the air amount to be blown from the face air outlet is set larger than the air amount to be blown from the diffusion air outlet. Specifically, the air amount to be blown from the diffusion air outlet and the face air outlet is set equal to or larger than 70% of the air amount blown by the front blower fan 114, and the air amount to be blown from the front seat 141 is set equal to or smaller than 30% of the air amount blown by the front blower fan 114. Further, the flow ratio of the air amount to be blown from the face air outlet to the air amount to be blown from the diffusion air outlet is substantially set at 7/3.

In the later stage of the cool down operation, the flow ratio of the air amount to be blown from both of the diffusion air outlet and the face air outlet to the air amount to be blown from the front seat 141 is set larger than that in the initial stage of the cool down operation. Further, the flow ratio of the air amount to be blown from the diffusion air outlet to the air amount to be blown from the face air outlet is set larger than that in the initial stage of the cool down operation. Specifically, the air amount to be blown from the diffusion air outlet and the face air outlet is set equal to or larger than 50% of the air amount blown by the blower fan 114, and the air amount to be blown from the front seat 141 is set equal to or smaller than 50% of the air amount blown by the blower fan 114. For example, the flow ratio of the air amount to be blown from the face air outlet to the air amount to be blown from the diffusion air outlet is substantially set at 5/5.

In the stationary cooling operation for the front seat side in the passenger compartment, the total air amount to be blown into the passenger compartment is set smaller than that in the cool down operation. Further, the air amount to be blown from the face air outlet is set larger than the air amount to be blown from the front seat 141, and the air amount to be blown from the diffusion air outlet is set larger than the air amount to be blown from the face air outlet.

Accordingly, the front air outlet mode is controlled in accordance with air conditioning state in the front seat area of the passenger compartment. Therefore, rapid cooling of the front seat area of the passenger compartment can be performed while comfortable feeling is given to the passenger on the front seat in the passenger compartment. Thus, a comfortable air-conditioning environment can be provided in the entire passenger compartment.

In the above-described fourth embodiment, the control operation of the front air conditioning unit 110 for the front seat area in the passenger compartment can be performed independently from the control operation of the rear air conditioning unit 120 for the rear seat area in the passenger compartment. Alternatively, one of the control operation of the front air conditioning unit 110 for the front seat area in the passenger compartment and the control operation of the rear air conditioning unit 120 for the rear seat area in the passenger compartment can be performed.

Modifications of the Above-described Embodiments

Although the present invention has been fully described in connection with the preferred embodiments thereof with reference to the accompanying drawings, it is to be noted that various changes and modifications will become apparent to those skilled in the art.

For example, in the above-described first to third embodiments of the present invention, conditioned air is not blown from the indirect air outlets such as the instrument panel air outlet 6 and the door air outlet 9 in the initial stage of the cool down operation. However, the present invention is not limited to this manner. For example,conditioned air can be blown from the indirect air outlets in the initial stage of the cool down operation. In this case, as the inside air temperature Tr reduces, an air blowing amount from the indirect air outlets such as the instrument panel air outlet 6 and the door air outlet 9 is increased. Further, as the direct air outlet, the other local air outlets such as the side face air outlets 5 can be also used.

Further, in the above-described embodiments of the present invention, the cool down operation is separated into the two stages (initial and later stages), and the air blowing control is performed in the two stages. However, in the present invention, the cool down operation may be separated into three or more stages, or in a non-stage manner, without being limited to this control operation. For example, the cool down operation can be continuously controlled without a stage.

In the above-described fourth embodiment, conditioned air is diffused from a substantially entire area of the ceiling. However, in the present invention, for example, conditioned air may be locally blown from the ceiling to the passenger (i.e., seat), without being limited to this manner. Further, in the fourth embodiment, the control operation in the present invention is performed by using the ECU 150. However, the control operation of the present invention is not limited to this manner.

Such changes and modifications are to be understood as being within the scope of the present invention as defined by the appended claims.

What is claimed is:

1. An air conditioner for a vehicle comprising:
   an air conditioning unit that adjusts an air temperature so that conditioned air to be blown into a passenger compartment is obtained;
   an air outlet portion having a plurality of air outlets from which conditioned air of the air conditioning unit is blown into the passenger compartment, the air outlet portion having
      a direct air outlet from which conditioned air is directly blown to a passenger in the passenger compartment, and
      an indirect air outlet from which conditioned air is indirectly supplied to the passenger, the indirect air outlet being provided in an inner wall portion of the passenger compartment for supplying conditioned air substantially from an entire area of the inner wall portion;
   a cooling state determining means for determining a proceeding state in a rapid cooling operation; and
   an air amount control unit for controlling an air amount blown from the direct air outlet and an air amount blown from the indirect air outlet based on the proceeding state detected by the cooling state determining means,
   wherein the air amount control unit increases the air amount blown from the direct air outlet to be larger than the air amount blown from the indirect air outlet, when the cooling state determining means determines that the proceeding state is in an initial stage with respect to a predetermined stage.

2. The air conditioner according to claim 1, wherein:
   the air amount control unit increases the air amount blown from the indirect air outlet to be larger than the air amount blown from the direct air outlet, when the cooling state determining means determines that the proceeding state is in a later stage with respect to the predetermined stage.

3. The air conditioner according to claim 2, wherein:
   when the cooling state determining means determines that the rapid cooling operation is ended, the air amount control unit reduces a total air amount blown into the passenger compartment to be smaller than that in the initial stage of the rapid cooling operation while supplying conditioned air from the indirect air outlet into the passenger compartment.

4. The air conditioner according to claim 3, wherein:
   when the cooling state determining means determines that the rapid cooling operation is ended, the air amount control unit supplies conditioned air only from the indirect air outlet into the passenger compartment.

5. The air conditioner according to claim 1, wherein the direct air outlet is opened in a dashboard to face a passenger on a front seat in the passenger compartment.

6. The air conditioner according to claim 1, wherein the direct air outlet is provided in a seat of the passenger compartment, for blowing conditioned air from a seat surface to a passenger on the seat.

7. The air conditioner according to claim 1, wherein the indirect air outlet is provided to diffuse and blow conditioned air substantially from an entire area of an upper surface of the dashboard.

8. The air conditioner according to claim 1, wherein the indirect air outlet is provided in a door to diffuse and blow conditioned air from a wall surface of the door.

9. The air conditioner according to claim 1, wherein the indirect air outlet is provided in a ceiling of the passenger compartment to diffuse and blow conditioned air substantially from an entire area of the ceiling.

10. The air conditioner according to claim 1, wherein:
    the indirect air outlet is a wall-surface air blowing means for indirectly blowing conditioned air toward a passenger in the passenger compartment from an inner design wall portion of the passenger compartment;
    the direct air outlet includes a seat air blowing means for directly blowing conditioned air toward a passenger on a seat in the passenger compartment;
    the cooling state determining means includes a rapid-cooling determining means for determining whether the rapid cooling operation is performed; and
    the air amount control unit includes a rapid-cooling amount control means for determining a first air amount to be blown from both of the wall-surface air blowing means and the seat air blowing means when the rapid-cooling determining means determines that the rapid cooling operation is performed, and a stationary-cooling amount control means for determining a second air amount to be blown from both of the wall-surface air blowing means and the seat air blowing means when the rapid-cooling determining means determines that the rapid cooling operation is not performed.

11. The air conditioner according to claim 10, wherein:
    the rapid-cooling amount control means increases the air amount blown from the seat air blowing means to be larger than the air amount blown from the wall-surface air blowing means, when the cooling state determining means determines that the proceeding state of the rapid cooling operation is in the initial stage with respect to the predetermined stage.

12. The air conditioner according to claim 11, wherein:
    when the cooling state determining means determines that the proceeding state of the rapid cooling operation is in the later stage with respect to the predetermined stage, the rapid-cooling amount control means increases a flow ratio of the air amount blown from the wall-surface air blowing means to the air amount blown from the seat air blowing means to be larger than that in the initial stage.

13. The air conditioner according to claim 10, wherein:
    when the rapid-cooling determining means determines that the rapid cooling operation is not performed, the stationary cooling-amount control means reduces a total air amount blown into the passenger compartment than that in the rapid cooling operation and increases the air amount blown from the wall-surface air blowing means to be larger than the air amount blown from the seat air blowing means.

14. The air conditioner according to claim 10, wherein:
    the indirect air outlet includes a diffusion air blowing means provided in a substantially entire area of an upper surface of a dashboard;

the direct air outlet further includes a local air blowing means provided in the dashboard, from which conditioned air is locally blown;

the rapid-cooling amount control means determines a total air amount blown from the diffusion air blowing means provided in the dashboard, the local air blowing means provided in the dashboard and the seat air blowing means, when the rapid-cooling determining means determines that the rapid cooling operation is performed; and the stationary-cooling amount control means determines a total air amount blown from the diffusion air blowing means provided in the dashboard, the local air blowing means provided in the dashboard and the seat air blowing means provided in the seat when the rapid-cooling determining means determines that the rapid cooling operation is not performed.

15. The air conditioner according to claim 14, wherein:

the rapid-cooling amount control means increases an air amount blown from both of the diffusion air blowing means and the local air blowing means provided in the dashboard to be larger than the air amount blown from the seat air blowing means, when the cooling state determining means determines that the proceeding state of the rapid cooling operation is in the initial stage with respect to the predetermined stage.

16. The air conditioner according to claim 15, wherein:

the rapid-cooling amount control means increases an air amount blown from the local air blowing means in the dashboard to be larger than the air amount blown from the diffusion air blowing means provided in the dashboard, when the cooling state determining means determines that the proceeding state of the rapid cooling operation is in the initial stage with respect to the predetermined stage.

17. The air conditioner according to claim 16, wherein:

when the cooling state determining means determines that the proceeding state of the rapid cooling operation is in the later stage with respect to the predetermined stage, the rapid-cooling amount control means increases a flow ratio of the air amount blown from the diffusion air blowing means and the local air blowing means to the air amount blown from the seat air blowing means, to be larger than that in the initial stage.

18. The air conditioner according to claim 17, wherein:

when the cooling state determining means determines that the proceeding state of the rapid cooling operation is in the later stage with respect to the predetermined stage, the rapid-cooling amount control means increases a flow ratio of the air amount blown from the diffusion air blowing means to the air amount blown from the local air blowing means, to be larger than that in the initial stage.

19. The air conditioner according to claim 14, wherein:

when the rapid-cooling determining means determines that the rapid cooling operation is not performed, the stationary-cooling amount control means increases an air amount blown from both of the diffusion air blowing means and the local air blowing means provided in the dashboard to be larger than an air amount blown from the seat air blowing means while reducing a total air amount blown into the passenger compartment than a total air amount in the rapid cooling operation.

20. The air conditioner according to claim 19, wherein:

the stationary-cooling amount control means increases an air amount blown from the diffusion air blowing means provided in the dashboard to be larger than an air amount blown from the local air blowing means provided in the dashboard, when the rapid-cooling determining means determines that the rapid cooling operation is not performed.

* * * * *

UNITED STATES PATENT AND TRADEMARK OFFICE
CERTIFICATE OF CORRECTION

PATENT NO. : 6,758,740 B2
DATED : July 6, 2004
INVENTOR(S) : Kazushi Shikata et al.

It is certified that error appears in the above-identified patent and that said Letters Patent is hereby corrected as shown below:

<u>Title page,</u>
Item [75], Inventors, "Mak to Um bayashi" should be -- Makoto Umebayashi --.

Signed and Sealed this

Thirtieth Day of November, 2004

JON W. DUDAS
*Director of the United States Patent and Trademark Office*